Jan. 27, 1942.  H. O. DROTNING ET AL  2,271,221
DISENGAGING MECHANISM FOR SPRING MOTOR DRIVES
Filed June 30, 1939
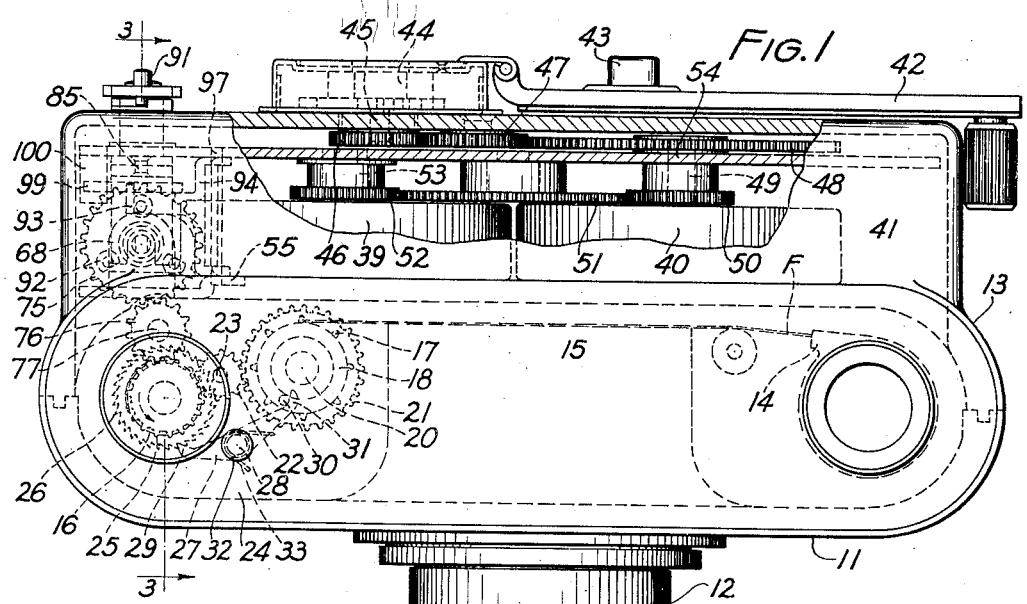
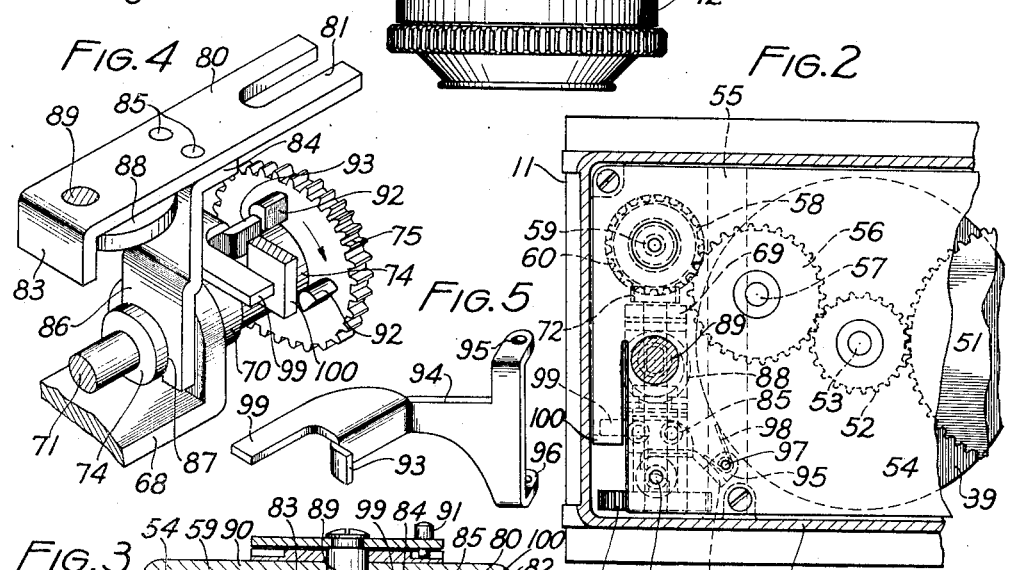
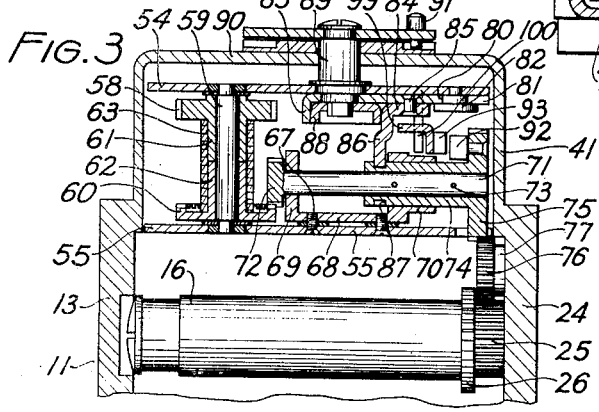
HENRY O. DROTNING
EDWARD KOSZALKA JR.
INVENTORS
BY
ATTORNEYS Patented Jan. 27, 1942

2,271,221

UNITED STATES PATENT OFFICE 2,271,221

DISENGAGING MECHANISM FOR SPRING MOTOR DRIVES

Henry O. Drotning and Edward Koszalka, Jr., Rochester, N. Y., assignors to Eastman Kodak Company, Rochester, N. Y., a corporation of New Jersey Application June 30, 1939, Serial No. 282,306

10 Claims. (Cl. 242—71)

The present invention relates to photography, and more particularly to a camera in which a spring motor is operatively connected to the takeup spool to automatically rotate the latter to feed or shift the film strip to successively bring unexposed portions thereof into exposing position.

One object of the invention is the provision of a mechanism for selectively connecting the spring motor to and disconnecting it from the takeup spool.

Another object of the invention is the provision of a mechanism of this type in which the takeup spool may be completely disengaged and freed from the spring motor drive means so that the exposed film which is wound onto the takeup spool may be refound back into a supply retort which is positioned at the opposite end of the camera.

Still another object of the invention is the provision of an arrangement by which the spring motor is effectively locked against reverse rotation when disconnected from the takeup spool so as to prevent the unwinding or running down of the motor.

A further object of the invention is the provision of a suitable clutch positioned between the spring motor and the takeup spool whereby the latter is effectively disconnected from the spring motor during the tensioning or winding up operation of the latter so as to prevent reverse rotation of the takeup spool while the spring motors are being tensioned.

To these and other ends, the invention resides in certain improvements and combinations of parts, all as will be hereinafter more fully described, the novel features being pointed out in the claims at the end of the specification.

In the drawing:

Fig. 1 is a plan view of a camera of the roll film type, with parts in section and parts in elevation, showing the arrangement of a spring motor drive for the takeup spool constructed in accordance with the present invention;

Fig. 2 is a rear view of a portion of the mechanism illustrated in Fig. 1, showing the relation of the various parts of the spring motor drive for the takeup spool;

Fig. 3 is a sectional view taken substantially on the line 3—3 of Fig. 1, showing the arrangement by which the spring motor drive is connected to the takeup spool to rotate the latter to automatically shift or advance the film, and also showing the mechanism by which the motor drive may be disconnected from the takeup spool to free the latter to permit the rewinding of the film strip into the supply retort;

Fig. 4 is a perspective view of a portion of the mechanism illustrated in Fig. 3, showing the shifting mechanism by which the spring motor may be disconnected from the takeup roll, and the arrangement by which the spring motor is locked against running down when so disconnected; and Fig. 5 is a perspective view of the spring motor locking member for preventing unwinding of the motor when disconnected from the takeup roll.

Similar reference numerals throughout the various views indicate the same parts.

The present invention relates to a camera of the roll film type in which a roll of minature perforated film is arranged in a supply retort positioned at one end of the camera. The unexposed film strip is drawn from the retort and fed or intermittently shifted across the back of the camera after each exposure, and is finally wound up on a takeup roll positioned at the opposite end of the camera. A feed sprocket is operatively connected to and driven from the takeup roll to cooperate therewith to shift the film. A spring motor is connected to and drives the takeup roll so that the shifting of the film is automatic, thus relieving the operator of the necessity of winding the film after each exposure. After the entire roll, or any desired portion thereof, has been exposed, the film is then rewound back into the supply retort. During this rewind operation, the motor drive is disconnected from the takeup roll so as to free the latter, as will be hereinafter more fully described. When the motor is so disconnected, it is positively locked so as to prevent the unwinding or running down of the spring motor, the advantages of which will be readily apparent to those in the art.

Fig. 1 of the drawing shows a camera of the roll film type intended for use with minature perforated film. The camera comprises, broadly, a body portion or case 11 on the front of which is mounted the objective lens 12. The back of the camera is closed by a removable back 13 to permit access to the interior of the camera, as is well known. A supply retort 14 is positioned at one end of the camera and provides a supply of minature marginal perforated film F which is intermittently drawn or shifted across the exposure frame 15. After the exposure is made, the film is then wound up onto a takeup roll or spool 16 positioned at the opposite end of the camera. As the film moves across the camera, the marginal perforations thereof engage the teeth 17 of a feed sprocket 18 which is positioned adjacent the takeup spool, all as shown in Fig. 1.

The film strip is wound onto the takeup spool 16 by rotating the latter in the direction of the arrow, Fig. 1. The rotation of the takeup spool is utilized to drive the film feed sprocket 18 which, in turn, controls a film measuring mechanism which automatically locks the takeup spool against further rotation after the film strip has been moved a distance of one image area, as will be later pointed out. To secure this result, the sprocket shaft 20 has mounted thereon a gear 21 which meshes with an idler gear 22 carried by a stub-shaft 23 supported on the camera wall 24. This idler gear, in turn, meshes with a gear 25 secured to and rotatable with the takeup spool 16. The feed sprocket 18 is made of such a diameter that one revolution thereof will move one exposure or image area of film across the exposure frame 15. At the end of this movement, the windup spool and the feed sprocket are locked against further movement. This locking means comprises a ratchet 26 which is secured to or formed integral with the gear 25 and which lies in the path of a pawl 27 pivotally mounted on a shaft or stud 28 secured to the camera wall 24. The pawl 27 has one end thereof formed to provide a hooked locking member 29 which, when the pawl is rotated in a clockwise direction, as viewed in Fig. 1, engages the ratchet 26 to lock the gear 25 and hence the takeup shaft and feed sprocket against further rotation, as will be apparent from an inspection of Fig. 1.

In order that this locking of the windup spool will occur in proper timed relation with the film movement, the operation of the pawl 27, is controlled by the feed sprocket 18. To this end, the gear 20 on the sprocket shaft is formed with a pin 30 which, when the sprocket has made one revolution, engages a lug 31 formed on the other end of the pawl 27 to pivot the pawl in a clockwise direction about the shaft 28, as viewed in Fig. 1, to bring the hook 29 into locking engagement with the ratchet 26. Thus upon each revolution of the feed sprocket 18, the windup spool 16 is locked, and as each such revolution moves one image area, the locking of the takeup spool occurs when a new and unexposed portion of the film strip has been positioned over the image frame 15. After the windup spool has been thus locked, the film strip is in position to make an exposure.

Upon completing of the exposure, the pawl 27 is then moved to an inoperative position to free the takeup spool so that the exposed film may be wound thereon. The pawl is thus moved by means of a button 32 which is spring pressed outwardly by means of a coil spring 33 which is wrapped around the shaft 28 and is suitably secured to the pawl 27, in a manner shown in the patent to Drotning, Number 2,241,122, May 6, 1941, to which reference may be had for a detailed showing. When the button 32 is pressed inwardly, the lug 31 is moved out of engagement with the pin 30 to free the pawl 27, the latter then moving in a counter-clockwise direction under the action of the spring 33 to move the hook 29 out of engagement with the ratchet. As the windup shaft is now free, it may be rotated to wind the exposed film thereon. The above described locking means for the takeup spool and the control therefor, are clearly shown and described in Drotning's above mentioned patent to which reference may be had for more detailed description. As such mechanism does not constitute a part of the present invention, a further discussion is not deemed necessary. The Nelson Patent 2,150,696 shows a take-up spool locking arrangement which is somewhat similar to that covered by the present application except that the feed sprocket is driven by the film strip rather than by a gear train from the takeup spool, as in present embodiment.

As is apparent, the exposed portion of the film strip may be wound onto the takeup spool 16 by manually rotating the latter in the direction of the arrow, Fig. 1. The present invention, however, provides an arrangement by which the film strip is automatically fed or shifted each time the pawl 27 is released. After the film has been shifted a distance of one image area, the pawl 27 again engages a ratchet 26 to arrest further movement of the film strip. This automatic shifting means comprises, in the present embodiment, a pair of spring motors generally indicated by the numerals 39 and 40 which are positioned in a suitable housing or casing 41 secured to or formed integral with the camera back 13, as shown in Fig. 1.

Obviously, before the motors 39 and 40 can be effective to shift the film they must first be wound up or tensioned. This tensioning is accomplished by turning a crank or handle 42. In order that such turning may be transmitted to the motors to tension the latter, the handle 42 is formed with a lug 43 which engages a socket 44 formed in a shaft 45 so that the rotation of the handle also rotates the shaft 45. The latter has secured to the lower end thereof a small gear 46 which is connected by a small idler gear 47 to a large gear 48 mounted on the upper end of the shaft 49 of the motor 40. The shaft 49 also carries a gear 50 which meshes with an idler gear 51 which in turn engages a gear 52 on the shaft 53 of the motor 39. The spring motors 39 and 40 are thus connected together in what may be termed a series relation and are both simultaneously wound or tensioned when the handle 42 is rotated in the proper direction. After the motors have been thus properly tensioned, the handle 42 may be moved to an inoperative position, as shown in Fig. 1. As such spring motors and the winding or tensioning means therefor are well known to those in the art a further discussion is not deemed essential. The spring motors and the various drive members, to be later described, are secured to a pair of spaced mechanism plates 54 and 55 which are suitably secured in position in the casing 41. By means of this arrangement the entire motor drive may be assembled as a unit and inserted in the casing 41.

In order that the stored up energy in the tensioned spring motors may be effective to drive the takeup spool, the latter is suitably connected in driven relation with the spring motors. In the present embodiment, this driving connection comprises an idler gear 56 rotatably mounted on a shaft 57 secured to the mechanism plate 54 and meshing with the gear 52 on the motor shaft 53. The gear 56 is also in driving engagement with the gear 58 loosely mounted on the upper end of a spindle 59 the opposite ends of which are anchored in the spaced mechanism plates 54 and 55, see Fig. 3. The lower end of the spindle 59 has loosely mounted thereon a crown gear 60 which is spaced from the gear 58, as best shown in Fig. 3. The gears 58 and 60 are both formed with sleeve portions 61 and 62 respectively which surround the spindle 59 and are in abutting relation, as shown in Fig. 3. A coil spring 63 surrounds the sleeves 61 and 62 and forms a spring clutch between the gears 58 and 60 so as to uncouple the latter from the spring motors when the latter are being tensioned or wound up, as will be later pointed out. During the driving operation, however, the spring 63 tightly grips the sleeves 61 and 62 and affords a positive driving connection between the gears 58 and 60.

The lower mechanism plate 55, Fig. 3, has secured thereto, by screws 67 or other suitable fastening means, a U-shaped bracket, 68, the ends of which afford spaced bearings 69 and 70 for an axially movable shaft 71, the purpose of which construction will be later pointed out. The left end of the shaft 71, as viewed in Fig. 3, has secured thereto a gear 72 which meshes with the crown gear 60 to form a driving means therewith. The gear 72 is of such a width as never to be disengaged from the gear 60 when the shaft 71 is moved axially, in a manner to be hereinafter pointed out. The right end of the shaft 71, Fig. 3, has secured thereto by pins 73 a sleeve 74 which is slidably mounted in the bearing 70, as shown in Fig. 3. The outer or right end of this sleeve 74 has secured thereto or formed integral therewith a gear 75 which meshes with an idler gear 76 rotatably mounted on a stub-shaft 77 secured to the camera wall 24. The gear 76 in turn meshes with the previously mentioned gear 25 on the takeup spool 16.

It is thus apparent that the spring motors 39 and 40 are operatively connected in driving relation with the takeup spool 16 and tend to rotate the latter to wind the exposed film thereon. Such rotation is, however, normally prevented by reason of the engagement of the pawl 27 with the ratchet 26. When, however, an exposure has been made, the film strip may be automatically advanced or shifted one image area merely by pressing the button 32 inwardly. Upon such movement of the button, the pawl 27 is moved out of locking engagement with the ratchet 26, as above described, and the takeup spool is now free. The spring motors now become effective to rotate the takeup spool 16 and the feed sprocket 18 to shift the film strip across the back of the camera. However, after a length of film equal to one image area has been so shifted, the pin 30 of the gear 21 engages the lug 30 on the pawl 27 to again move the latter into locking engagement with the ratchet 26 to prevent further movement or shifting of the film strip. Thus after each exposure, the button 32 is momentarily depressed to release the takeup spool. The spring motors then become effective to automatically shift the film, and, after the latter has been shifted the proper amount, the takeup spool is then again locked against further rotation.

In cameras of the class described, the unexposed film is drawn from the light-tight retort 14 across the exposure frame 15, and, after the exposure is made, is wound up on a takeup spool 16. After the entire roll of film, or any desired portion thereof, has been exposed, and it is desired to remove the film from the camera so that it may be developed, the exposed film is first rewound back into the light-tight retort 14, as is well known. The retort with its rewound film may be safely removed from the camera. However, in order to thus rewind the film, it is essential that the takeup spool be freed or disconnected from the spring motor driving means. To secure this disengagement, the present invention provides a simple yet highly effective arrangement for moving the gear 75 out of driving engagement with the gear 76 to thus disconnect the spring motors from the takeup spool. Obviously upon such disengagement, the takeup spool will be free and the film may be readily rewound back into the takeup retort.

As the gear 75 is mounted on the sleeve 74, any axial movement of the latter will serve to move the gear 75 into and out of driving engagement with the gear 76. The moving mechanism for the gear 75 comprises a plate 80, one end 81 of which is bifurcated, as shown in Fig. 4, to receive a rivet or stud 82 by which the plate is slidably mounted on the upper mechanism plate 54, as best shown in Fig. 3. The other end of the plate 80 is bent downwardly to form a lug 83. An L-shaped plate has a leg 84 thereof secured by rivets 85 to an intermediate portion of the plate 80. The other leg 86 of the L-shaped plate is spaced from the lug 83 and extends downwardly and has the lower end thereof bifurcated to engage in a circumferential slot 87 in the sleeve 74, as best shown in Fig. 4. Thus any sliding movement of the plate 80 will, through the connection between the leg 86 and the slotted sleeve 74, correspondingly move shaft 71 axially to connect the gear 75 to and disconnect it from the gear 76.

Referring now to Fig. 3, it is apparent that as the plate 80 is moved or slid to the right, the gear 75 will be moved into driving engagement with the gear 76 and hence the takeup spool 16 to connect the latter to the spring motors 39 and 40. On the other hand, if the plate 80 is moved to the left, as viewed in Fig. 3, the gear 75 will move out of mesh with the gear 76 to disconnect the motors from the takeup spool. The gear 75 may, therefore, be broadly considered as one number of a clutch for connecting the spring motors to and disconnecting them from the wind up shaft. The gear 72 is preferably made of such a width that it remains in engagement with the crown gear 60. This sliding movement of the plate 80 is accomplished by means of a cam 88 which is positioned between the lug 83 and the leg 86 of the L-shaped plate, and is secured to the lower end of a spindle 89 which extends upwardly through a wall 90 of the casing 41. The outer end of the spindle 89 has secured thereto a handle 91 by which the spindle 89 and hence the cam 88 may be rotated to shift the plate 80, as above described. By means of this arrangement, rotation of the handle 91 in one direction moves the gear 75 into mesh with the gear 76 to operatively connect the spring motors to the takeup spool so that the film may be automatically shifted after each exposure. When, however, the film is to be rewound into the retort 14, the handle 91 is rotated in the opposite direction to move the gear 75 out of mesh with the gear 76 to free the takeup spool, as above described.

When the spring motors are operatively connected to the takeup spool, they are effectively held against reverse rotation and are thus prevented from unwinding or running down. However, when the gear 75 is slid to the left, as above described, the spring motors are entirely disconnected from the takeup spool. Obviously, when so disconnected, some means must be provided for locking the motors against reverse rotation, otherwise they would quickly unwind or run down, as will be apparent. In order to prevent such unwinding, the gear 75 is provided with a plurality of radially extending lugs 92, one of which is arranged to engage a stop or lug 93 when the gear 75 is moved to its disengaged position to effectively lock the gear 75 and hence the spring motors against reverse rotation. This interengaging stop and lug arrangement provides a simple and effective means for preventing the unwinding of the motors when the latter are disconnected from the takeup spool.

It is apparent from an inspection of Fig. 4, that if the stop 93 were fixed and the gear 75 came to rest with one of the lugs 92 in alignment with the stop 93, any attempt to move the gear 75 to its disengaged position would tend to break or bend some of the parts. This difficulty is avoided by forming the stop 93 out of the material of a bracket 94 of the shape best shown in Fig. 5. This bracket is roughly L-shaped and has one end thereof formed with spaced bearing arms 95 and 96 which are rotatably mounted on a spindle 97 the ends of which are secured to spaced mechanism plates 54 and 55. A coil spring 98 is wrapped around the spindle 97, as shown in Fig. 2, and tends to rotate the bracket 94 in a counterclockwise direction to move the stop 93 into the path of the lug 92. This movement of the bracket is limited by the engagement of an arm 99 of the bracket with a fixed stop 100 formed by bending down a portion of the upper mechanism plate 54. With this arrangement, if the parts are in the position shown in Fig. 4, disconnecting movement of the gear 75 will bring the lug 92 into engagement with the stop 93 to pivot the bracket 94. However, after the gear 75 has been completely disengaged from the gear 76, the spring motor will tend to unwind. This unwinding movement will rotate the gear 75 in a reverse direction to move the lug 92 out of alignment with the stop 93. The spring 98 will now rotate the bracket to position the stop 93 in the path of one of the lugs 92 so that upon engagement therewith, the gear 75 is effectively locked against reverse rotation to prevent unwinding of the spring motor. Obviously, if the stop 93 is not in alignment with one of the lugs 92 when the gear 75 is disconnected, the bracket 94 will not be moved, and the stop 93 will be positioned in the path of one of the lugs 92 to engage the latter.

Thus the spring motors are effectively held against unwinding or running down when disconnected from the takeup spool. After a new retort has been placed in the camera and the end of the film strip secured to the takeup roll, the handle 91 is rotated to slide the plate 80 and the gear 75 to the right, as viewed in Fig. 3, to bring the gear 75 into engagement with the gear 76 to operatively connect the spring motors in driving engagement with the takeup spool. Such rightward movement of the gear 75 also moves the lugs 92 out of the path of the stop 93, as shown in Fig. 3. Now upon releasing of the pawl 27, the motors will automatically shift the film strip the distance of one image area. When the motors are to be again wound, the handle or winding crank 42 is moved to bring the lug 43 thereof into driving engagement with the socket 44 of the shaft 45. Then by rotating the crank, the spring motors may be wound up or tensioned. As is apparent, rotation of the motor driving mechanism during this winding operation is the reverse of that during the film winding or driving operation. However, as the motors are operatively connected to the takeup spool the latter would tend to rotate in the opposite direction during this tensioning operation. Such reverse rotation of the takeup spool is prevented by reason of the spring clutch 63 which effectively disconnects the gear 60 from the spring motor drive during this tensioning operation so as to retain the takeup shaft stationary. On completion of the windup operation, the spring clutch 63 again connects the motor in driving relation with the takeup spool by connecting the gears 58 and 60. As the film winding operation continues, the diameter of the exposed film on the takeup spool gradually increases, as is well known. In order to compensate for this increasing diameter of the take-up spool, some form of compensating means must obviously be provided between the take-up spool and the spring motor drive mechanism. For example, the gear ratios of the various gears in the drive mechanism may be such that the first portion of the film strip is wound rather loosely on the take-up spool. As winding continues, the film strip is gradually drawn tighter and tighter until, when the winding is completed, the roll of film has attained the desired degree of tightness. Thus by properly proportioning the gears, provision is made for the increasing diameter of the take-up spool.

It is apparent from the above description, that the present invention provides a mechanism by which a spring motor drive may be selectively moved into and out of driving relation with a takeup spool. Furthermore, the invention provides a simple and effective mechanism which effectively locks the spring motors when the latter are disconnected to prevent unwinding of the motors. In addition, a suitable clutch is provided between the spring motors and the takeup spool so that the latter is effectively disconnected from the spring motors during the tensioning thereof so as to prevent reverse rotation of the takeup spool when the motors are being tensioned.

While one embodiment of the invention has been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

We claim:

1. In a film camera having a casing, the combination with a takeup spool rotatably mounted in one end of said casing, a spring drive means connectable to said spool to drive the latter to automatically shift said film, releasing and stopping means for said drive means, of means including a member adapted to be moved out of driving relation with said take-up spool for disconnecting said drive from said spool to free the latter, and means arranged to engage said member when the latter is moved out of said driving relation to lock said drive means to prevent unwinding thereof when disconnected from said spool.

2. In a film camera having a casing, the combination with a take-up spool rotatably mounted in one end of said casing, of a spring actuated drive means, a slidable clutch member for connecting said drive means to said spool to rotate the latter to shift said film, means for moving said clutch member into and out of driving relation with said spool, and means directly engaging said slidable clutch member when the latter is disconnected to lock said member against rotation to prevent unwinding of said spring drive means.

3. In a film camera having a casing, the combination with a take-up spool rotatably mounted in one end of said casing, of a spring actuated drive means, a clutch comprising a rotatable slidable member operatively connected to said spring driving means, means for moving said slidable member in one direction to connect said drive means to said spool to wind said film thereon and movable in the opposite direction to disconnect said drive means from said spool to free the latter, and stop means for engaging said slidable member when the latter is moved in said opposite direction to lock said slidable member against reverse rotation by said spring drive means to prevent unwinding of the latter.

4. In a film camera having a casing, the combination with a take-up spool rotatably mounted in one end of said casing, of a spring actuated drive means comprising a slidable member movable into and out of driving relation with said spool, means for moving said slidable member, and means engaging said slidable member when the latter is disconnected from said spool to lock said drive means to prevent unwinding thereof.

5. In a film camera having a casing, the combination with a take-up spool rotatably mounted in one end of said casing, of a spring motor mounted on said casing, a gear slidably mounted on said casing and in driving relation with said motor, means for moving said gear into and out of driving relation with said spool, a cam for moving said gear, and cooperative locking members on said gear and said casing for locking said gear and said motor against unwinding when said gear is moved out of driving relation with said spool.

6. In a film camera having a casing, the combination with a take-up spool rotatably mounted in one end of said casing, of a gear fixed to one end of said spool, a spring motor mounted on said casing, a gear slidably mounted on said casing and in driving relation with said motor, means for moving said slidable gear into operative relation with said fixed gear to connect said motor to said spool to rotate the latter to shift said film and to also move said slidable gear out of operative relation with said fixed gear to disconnect said motor from said spool, a stop on said casing, and portions on said slidable gear arranged to engage said stop when said gears are disconnected to prevent unwinding of said motor.

7. In a film camera having a casing, the combination with a take-up spool rotatably mounted in one end of said casing, of a spring motor mounted on said casing, a slidable member for connecting said motor in driving relation with said spool to rotate the latter to shift said film, a clutch connecting said motor and said slidable member whereby the latter is held stationary when said motor is wound, means including a cam for moving said slidable member into driving relation with said spool, said means also serving to move said slidable member out of driving relation with said spool to disconnect the latter from said motor, a pivoted stop on said casing, laterally extending lugs on said slidable member arranged to engage said stop when said member is disconnected from said spool to lock said member against reverse rotation so as to prevent unwinding of said motor, and means for positioning said stop.

8. In a film camera having a casing, the combination with a take-up spool rotatably mounted in one end of said casing, a spring motor carried by said casing, means for tensioning said motor, of an axially movable shaft supported by said casing, a spring clutch operatively connecting said motor to said shaft when said motor is rotated in one direction and automatically disconnecting said shaft from said motor when the latter is rotated in the opposite direction for tensioning, a driving member carried by and movable as a unit with said shaft, a shifting member for said shaft slidably mounted on said casing, a cam engaging said shifting member to move the latter in one direction to bring said driving member in driving relation with said spool so that the latter will be positively driven by said motor to shift said film, said shifting member being also movable in the opposite direction by said cam to shift said driving member out of driving relation with said spool to free the latter, laterally extending lugs on said driving member, a bracket pivotally mounted on said casing, a stop on said bracket arranged to engage one of said lugs when said driving member is moved to said disengaged position to lock said driving member against reverse rotation to prevent unwinding of said motor, a spring for moving said bracket into position to bring said stop into the path of said lugs, and an arm on said casing positioned in the path of said bracket to limit said movement of said bracket.

9. In a film camera having a casing, the combination with a take-up spool rotatably supported in one end of said casing, a film supply retort positioned in the opposite end of said casing, film measuring means operatively connected to said spool, of a spring actuated drive means mounted on said casing, means for connecting said drive means to said spool, stopping means engaging said spool to prevent the driving thereof by said drive means, means for releasing said stopping means so that said drive means may rotate said spool to shift said film, means controlled by said measuring means for arresting said drive means when a predetermined length of film has been shifted, means for disengaging said connecting means from said spool to free the latter and said measuring means so that said film may be rewound into said retort, and means engaging said connecting means when the latter is disconnected from said spool to lock said drive means against reverse rotation so as to prevent the unwinding thereof.

10. In a film camera having a casing, the combination with a take-up spool rotatably supported in one end of said casing, a film supply retort positioned in the opposite end of said casing, film measuring means operatively connected to said spool, of a spring motor mounted on said casing, a movably mounted member for selectively connecting said motor to and disconnecting it from said spool, means including a manually operated cam for moving said member to connected and disconnected positions, a releasable catch mechanism normally holding the spool against rotation, means connected to the catch mechanism to release the latter so that said motor may rotate said spool to shift said film, means on said measuring means for moving said catch mechanism into locking relation with said spool when a predetermined length of film has been shifted, a lug on said movable member, and means on said casing positionable in the path of said lug when said member is moved to said disconnected position to lock said motor against unwinding.

HENRY O. DROTNING.
EDWARD KOSZALKA, Jr.